(12) United States Patent
To et al.

(10) Patent No.: US 9,166,658 B2
(45) Date of Patent: Oct. 20, 2015

(54) BASE STATION DEVICE, TERMINAL DEVICE, AND WIRELESS COMMUNICATION SYSTEM USING THE BASE STATION DEVICE AND THE TERMINAL DEVICE

(75) Inventors: Shimpei To, Osaka (JP); Takashi Onodera, Osaka (JP); Hiroshi Nakano, Osaka (JP); Hiromichi Tomeba, Osaka (JP); Minoru Kubota, Osaka (JP); Kozue Hirata, Osaka (JP); Alvaro Ruiz Delgado, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 236 days.

(21) Appl. No.: 13/877,368

(22) PCT Filed: Oct. 3, 2011

(86) PCT No.: PCT/JP2011/072738
§ 371 (c)(1),
(2), (4) Date: Jun. 12, 2013

(87) PCT Pub. No.: WO2012/049995
PCT Pub. Date: Apr. 19, 2012

(65) Prior Publication Data
US 2013/0286940 A1    Oct. 31, 2013

(30) Foreign Application Priority Data
Oct. 12, 2010  (JP) ................................ 2010-229336

(51) Int. Cl.
*H04W 4/00*  (2009.01)
*H04B 7/04*  (2006.01)
*H04B 7/06*  (2006.01)

(52) U.S. Cl.
CPC .............. *H04B 7/0417* (2013.01); *H04B 7/065* (2013.01); *H04B 7/0452* (2013.01)

(58) Field of Classification Search
CPC .............................. H04B 7/0417; H04B 7/065
USPC .......................................................... 370/328
See application file for complete search history.

(56) References Cited

U.S. PATENT DOCUMENTS

2006/0270360 A1   11/2006  Han et al.
2007/0104163 A1*   5/2007  Kim ............................... 370/338
(Continued)

FOREIGN PATENT DOCUMENTS

| EP | 1 705 820 A1 | 9/2006 |
|----|--------------|--------|
| JP | 2005-217935 A | 8/2005 |
| JP | 2008-543215 A | 11/2008 |
| WO | 2009/125954 A1 | 10/2009 |
| WO | 2010/101805 A2 | 9/2010 |

OTHER PUBLICATIONS

English translation of Official Communication issued in International Patent Application No. PCT/JP2011/072738, mailed on Dec. 13, 2011.

(Continued)

*Primary Examiner* — Shripal Khajuria
*Assistant Examiner* — Faisal Choudhury
(74) *Attorney, Agent, or Firm* — Keating & Bennett, LLP

(57) ABSTRACT

A wireless communication system in which a base station apparatus having a plurality of transmission antennas and one or more terminal apparatuses communicate with each other is provided with at least two methods of a first feedback method and a second feedback method regarding propagation path information at the time of reception. In accordance with a communication condition between the base station apparatus and the terminal apparatus, or the function of the terminal apparatus, the terminal apparatus performs feedback by one of the two methods of the first feedback method and the second feedback method. The base station apparatus performs spatial multiplexing transmission on the basis of the propagation path information that has been fed back. Thus, in a system in which CSI is fed back for MIMO transmission, desired transmission characteristics can be efficiently obtained.

11 Claims, 9 Drawing Sheets

(56) References Cited

U.S. PATENT DOCUMENTS

| | | |
|---|---|---|
| 2007/0159393 A1 | 7/2007 | Imai |
| 2010/0135173 A1* | 6/2010 | Tynderfeldt et al. ........... 370/252 |
| 2011/0032839 A1* | 2/2011 | Chen et al. .................... 370/252 |
| 2011/0159907 A1* | 6/2011 | Lee et al. ....................... 455/509 |
| 2012/0147831 A1* | 6/2012 | Golitschek ..................... 370/329 |
| 2012/0218962 A1* | 8/2012 | Kishiyama et al. ............ 370/329 |
| 2013/0064315 A1* | 3/2013 | Heath et al. .................... 375/260 |
| 2013/0201912 A1* | 8/2013 | Sheng et al. ................... 370/328 |
| 2014/0226735 A1* | 8/2014 | Zhang et al. ................... 375/260 |

OTHER PUBLICATIONS

Official Communication issued in International Patent Application No. PCT/JP2011/072738, mailed on Dec. 13, 2011.

Research in Motion, UK Limited, "Feedback Reduction in DL MU-MIMO using Pre-Assigned Companion Subsets", 3GPP TSG RAN WG1 Meeting #61, Montreal, Canada, May 10-14, 2010, pp. 1-4.

NTT Docomo, "Views on Single-Cell CSI Feedback Enhancement for DL MU-MIMO in LTE-Advanced", 3GPP TSG RAN WG1 Meeting #58bis, Miyazaki, Japan, Oct. 12-16, 2009, pp. 1-4.

\* cited by examiner

Result of measurement of propagation path

BASE STATION DEVICE, TERMINAL DEVICE, AND WIRELESS COMMUNICATION SYSTEM USING THE BASE STATION DEVICE AND THE TERMINAL DEVICE

TECHNICAL FIELD

The present invention relates to a transmission apparatus that performs MIMO transmission, a reception apparatus, and a wireless communication system using the apparatuses.

BACKGROUND

As a technology for realizing high frequency-utilization efficiency and high-speed transmission so as to address the tightening of frequency resources as a result of the increase in the amount of data communicated in wireless communication systems, such as cellular systems, researches on MIMO (Multiple-Input Multiple-Output) transmission are being actively conducted. According to MIMO, multiple transmission signals (transmission streams) are spatially multiplexed by using a plurality of transmission antennas of a transmission apparatus. As a type of MIMO transmission, a technology called "network MIMO" or "CoMP (Coordinated Multi Point Transmission)" by which multiple transmission signals are spatially multiplexed and transmitted from a plurality of transmission apparatuses is also gaining attention.

Among such MIMO transmission technologies, single user-MIMO (SU-MIMO), by which multiple transmission signals addressed to a single reception apparatus having a plurality of reception antennas are spatially multiplexed and transmitted simultaneously, enables a significant increase in the transmission rate of each transmission apparatus. Thus, this technology can be very effectively employed when high transmission rates are required, such as for transmission of moving images. Meanwhile, downlink multi user-MIMO (MU-MIMO) is a technology by which transmission signals addressed to a plurality of reception apparatuses are spatially multiplexed and transmitted simultaneously. This technology enables transmission that effectively utilizes the transmission sources, such as the transmission antennas on the transmitting side or the transmission apparatuses of adjacent cells, even when the number of reception antennas with which each reception apparatus is provided is small. In this technology, a multi-user diversity effect can be obtained by appropriately selecting the reception apparatuses for spatial multiplexing. Thus, MU-MIMO is gaining attention as a technology for increasing frequency utilization efficiency. Uplink MU-MIMO is a technology by which different signals are simultaneously transmitted from a plurality of transmission apparatuses to a reception apparatus provided with a plurality of reception antennas. This technology, which effectively utilizes the reception antennas of the reception apparatus, can also increase frequency utilization efficiency as in the case of downlink MU-MIMO.

Because such MIMO transmissions involve the transmission of a plurality of transmission signals by the same resource, precoding may be performed in advance on the transmitting side so as to prevent interference of reception signals on the receiving side. Normally, precoding is performed on the basis of the propagation path condition on the receiving side. Thus, in a FDD (Frequency Division Duplex) system, the propagation path is measured on the receiving side, and the result of measurement is fed back to the transmitting side as CSI (Channel State Information).

As a method for feeding back the CSI, the following two types have been proposed. One is a method by which the result of measurement of the propagation path is fed back as CSI (which may be referred to as "explicit feedback"). In this method, the result of measurement of an instantaneous propagation path or the result of measurement of an average propagation path over a long time is quantized and fed back. Because the propagation path measured by the reception apparatus is represented by amplitude and phase (vector), one (point A) that is the closest to the result of measurement (point indicated by a white dot) is selected from among candidates depicted in FIG. 1 (points indicated by black dots) and fed back to the transmitting side as the CSI (see Non-patent Document 1).

In the example of FIG. 1, 16 vectors are set in advance as propagation path candidates, so that four bits are required for selecting and feeding back any one point. When, for example, the number of the transmission antennas with which the transmission apparatus is equipped is four, and the number of the reception antennas with which the reception apparatus is equipped is two, a total of eight propagation paths×four bits=32 bits are required for feeding back all of the 4×2=8 propagation paths. In this reception apparatus, when a method by which reception signals are composed by multiplying signals received by the two reception antennas by a reception weight is used, an appropriate point among the candidate points depicted in FIG. 1 may be selected and fed back on the basis of an equivalent propagation path after multiplying by the reception weight. In this case, four propagation paths×four bits=16 bits are required for feedback.

As a feedback method different from the explicit feedback, a method (which may be referred to as "implicit feedback") is known by which candidates of vectors used for precoding on the transmitting side are determined in advance on the transmitting and receiving sides as known, and information about a vector that can be received with the most favorable characteristics among the candidates is fed back. For example, when the candidates of vectors (which may be referred to as a codebook) used for precoding are represented by the following 16 vectors, the vector with which the most favorable reception characteristics can be obtained is selected in each reception apparatus and fed back (see Non-patent Document 2 below).

$$\begin{pmatrix} 1 \\ 1 \\ 1 \\ 1 \end{pmatrix} \begin{pmatrix} 1 \\ j \\ -1 \\ -j \end{pmatrix} \begin{pmatrix} 1 \\ -1 \\ 1 \\ -1 \end{pmatrix} \begin{pmatrix} 1 \\ -j \\ -1 \\ j \end{pmatrix} \begin{pmatrix} 1 \\ \frac{1+j}{\sqrt{2}} \\ j \\ \frac{-1+j}{\sqrt{2}} \end{pmatrix} \begin{pmatrix} 1 \\ \frac{-1+j}{\sqrt{2}} \\ -j \\ \frac{1+j}{\sqrt{2}} \end{pmatrix} \quad (1)$$

$$\begin{pmatrix} 1 \\ \frac{-1-j}{\sqrt{2}} \\ j \\ \frac{1-j}{\sqrt{2}} \end{pmatrix} \begin{pmatrix} 1 \\ \frac{1-j}{\sqrt{2}} \\ -j \\ \frac{-1-j}{\sqrt{2}} \end{pmatrix} \begin{pmatrix} 1 \\ 1 \\ -1 \\ -1 \end{pmatrix} \begin{pmatrix} 1 \\ j \\ -1 \\ j \end{pmatrix} \begin{pmatrix} 1 \\ -1 \\ -1 \\ 1 \end{pmatrix} \begin{pmatrix} 1 \\ -j \\ 1 \\ -j \end{pmatrix}$$

$$\begin{pmatrix} 1 \\ 1 \\ 1 \\ -1 \end{pmatrix} \begin{pmatrix} 1 \\ 1 \\ -1 \\ 1 \end{pmatrix} \begin{pmatrix} 1 \\ -1 \\ 1 \\ 1 \end{pmatrix} \begin{pmatrix} 1 \\ -1 \\ -1 \\ -1 \end{pmatrix}$$

When the vector is $p_i$ (i=1, 2, ..., 16), and the propagation path matrix measured by the reception apparatus is H, in the reception apparatus in which the signals received by the two reception antennas are combined by MRC (Maximum Ratio Combining), the vector to be fed back is selected according to the following expression (2).

$$\underset{p_i}{\operatorname{argmax}} \|Hp_i\| \qquad (2)$$

The expression (2) indicates that, when a signal precoded with $p_i$ on the transmitting side is received via the propagation path H on the receiving side, the vector that maximizes the SNR (Signal to Noise power Ratio) is selected. It should be noted, however, that in a reception apparatus that combines the reception signals by a process such as MMSE (Minimum Mean Square Error), an appropriate precoding vector needs to be selected according to a reference corresponding to the reception process used, instead of the expression (2). Further, when two streams of transmission and reception are performed, the receiving side needs to select two vectors. When two vectors are selected from 16 candidates and information representing the vectors (such as an index for each vector) is fed back to the transmitting side, as in the present example, 2×4 bits=8 bits are required; when one vector is selected and information representing the vector is fed back to the transmitting side, 1×4 bits=4 bits are required.

Thus, when the vector that directly represents the measured propagation path is fed back (explicit feedback), the amount of feedback generally tends to be increased compared with the case where a vector with which favorable characteristics can be obtained is selected from among predetermined precoding vectors and fed back (implicit feedback). However, the actual propagation path cannot be known on the transmitting side in the case of implicit feedback. In contrast, it is known that when explicit feedback enables the transmitting side to know the propagation path upon actual reception of a signal on the receiving side, so that precoding can be performed accordingly and more favorable characteristics can be obtained. Thus, it can be said that explicit feedback and implicit feedback have a trade-off relationship from the viewpoints of transmission characteristics and the amount of feedback.

PRIOR ART DOCUMENTS

Non-patent Document 1: 3GPP TSG RAN WG1 R1-094241, October 2009
Non-patent Document 2: 3GPP TSG RAN WG1 R1-103068, May 2010

SUMMARY OF THE INVENTION

Problem to be Solved by the Invention

A conventional wireless communication system has a configuration such that one of the two types of CSI feedback methods noted above is adopted as a standard and the adopted method is used at all times. However, as mentioned above, the two types of feedback method have the trade-off relationship from the viewpoints of transmission characteristics and the amount of feedback, so that, depending on the communication condition or the function of the individual apparatuses, the other feedback method that is not adopted as the standard may be more suitable. Thus, when one of the feedback methods is used in a fixed manner, as in the existing system, appropriate feedback cannot be implemented in accordance with a condition, and it has been difficult to obtain desired transmission characteristics efficiently.

An object of the present invention is to efficiently obtain desired transmission characteristics by selecting a feedback method in accordance with a condition, in a system that performs MIMO transmission using CSI feedback.

Means of Solving the Problem

According to an aspect of the present invention, there is provided a wireless communication system in which a base station apparatus having a plurality of transmission antennas and one or more terminal apparatuses communicate with each other, and which includes at least two methods of a first feedback method and a second feedback method regarding propagation path information at the time of reception. The terminal apparatus performs feedback by one of the two methods of the first feedback method and the second feedback method in accordance with a communication condition between the base station apparatus and the terminal apparatus or the function of the terminal apparatus. The base station apparatus performs spatial multiplexing transmission on the basis of the propagation path information that is fed back. The two types of feedback method have a trade-off relationship from the viewpoints of transmission characteristics and the amount of feedback. Thus, one of the feedback methods may be suitable depending on the communication condition or the function of each apparatus. Accordingly, the two types of feedback method can be selectively used depending on the condition.

The first feedback method and the second feedback method may differ in the number of bits required for the feedback. The method that has a greater number of bits required for the feedback may be the first feedback method by which the propagation path at the time of reception is fed back in a quantized form. The method that has a smaller number of bits required for the feedback may be the second feedback method by which one of candidates of vectors used for precoding, which candidates are determined in advance as known by the transmitting and receiving sides, is selected, and information indicating the selected vector is fed back.

Preferably, the first feedback method may be employed when a band width for the feedback is not less than a predetermined threshold value, and the second feedback method may be employed when the band width is less than the threshold value.

Specifically, when the band width allocated for uplink transmission is wider than the threshold value, the method by which the result of measurement of the propagation path is fed back as CSI (explicit feedback) is employed, whereby precoding can be performed in accordance with the actual propagation path, although in this case the amount of feedback may be increased. On the other hand, when the band width allocated for uplink transmission is narrower than the threshold value, the method by which information indicating the vector that can be received with the most favorable characteristics from among the precoding vector candidates is fed back (implicit feedback) is employed, whereby the amount of feedback can be kept low, although in this case the interference suppressing accuracy by precoding may be somewhat degraded.

Preferably, the communication between the base station apparatus and the one or more terminal apparatuses may be performed by using a plurality of frequency channels, and the first feedback method or the second feedback method may be selected on a frequency channel basis. This is in light of the fact that at high frequencies, the amount of decay during propagation is greater than at low frequencies, so that the characteristics cannot be much improved even if explicit feedback is performed for high quality MIMO transmission. Thus, when the allocated frequency band is high, it is more efficient to select implicit feedback and decrease overhead than to select explicit feedback which requires a greater amount of feedback. Accordingly, by selecting and switching the feedback method in accordance with the allocated band, efficient MIMO transmission in which the trade-off between transmission characteristics and the amount of feedback is taken into consideration can be implemented.

Preferably, the first method may be employed when the terminal apparatus has a reception quality of not less than a predetermined threshold value, and the second method may be employed when the reception quality is less than the threshold value.

This is in light of the fact that the terminal apparatus located in the vicinity of the base station apparatus has high reception quality, so that very high-quality and high-speed transmission can be implemented by performing explicit feedback and transmission with highly accurate spatial multiplexing. The terminal apparatus located around a cell edge has low reception quality and, in this case, not much increase in transmission speed can be expected even if highly accurate spatial multiplexing is performed, so that it is more efficient to perform implicit feedback to obtain a certain level of transmission characteristics while decreasing overhead.

Preferably, the first feedback method may be employed when the terminal apparatus has a moving speed of not more than a predetermined threshold value, and the second feedback method may be employed when the moving speed is not less than the threshold value.

Generally, the propagation path for each terminal apparatus varies depending on the moving speed. Thus, even if highly accurate spatial multiplexing based on explicit feedback is performed for the terminal apparatus moving at relatively high speed, the propagation path at the time of feedback and the propagation path at the time of spatial multiplexing transmission may be varied to such an extent that the transmission characteristics can be greatly degraded. Accordingly, it is more efficient to perform implicit feedback rather than explicit feedback for the high-speed mobile terminal so as to ensure a certain level of transmission characteristics while decreasing overhead by the feedback. On the other hand, for the terminal apparatus which is in low-speed movement state or semi-stationary state, for example, there is not much difference between the propagation path at the time of feedback and the propagation path at the time of spatial multiplexing transmission. Thus, in this case, by performing the highly accurate spatial multiplexing based on explicit feedback, highly favorable transmission characteristics can be obtained. Accordingly, the moving speed of each terminal apparatus is detected, the terminal apparatus that is moving at high speed performs implicit feedback, another terminal apparatus that is moving at low speed performs explicit feedback, and MIMO transmission is performed on the basis of the respective CSI that has been fed back.

Preferably, the first feedback method may be employed when a value indicating frequency variation in the propagation path information that is fed back is not less than a predetermined threshold value and the propagation path is greatly varied, while the second feedback method may be employed when the value indicating the frequency variation is less than the threshold value and the propagation path is moderately varied.

This is in light of the fact that in a condition in which the frequency selectivity of the propagation path is severe, the transmission characteristics may be greatly degraded unless the highly accurate spatial multiplexing based on explicit feedback is performed, whereas in a condition where the frequency selectivity is moderate, a certain level of transmission characteristics can be ensured even if the spatial multiplexing based on implicit feedback is performed. Thus, according to the present embodiment, information about the frequency selectivity of the propagation path for each terminal apparatus is detected, the terminal apparatus with moderate frequency selectivity performs implicit feedback, the terminal apparatus with severe frequency selectivity performs explicit feedback, and MIMO transmission is performed on the basis of the respective CSI that has been fed back.

Preferably, the first feedback method may be employed when the communication between the base station apparatus and the terminal apparatus has a cell area to be controlled which is wider than a predetermined threshold value, and the second feedback method may be employed when the communication between the base station apparatus and the terminal apparatus has a cell area to be controlled which is narrower than the threshold value.

Preferably, a plurality of terminal apparatuses that have performed the feedback regarding the propagation path information by the same feedback method may be selected for spatial multiplexing from the plurality of terminal apparatuses that communicate with the base station apparatus, and different transmission signals addressed to the selected plurality of terminal apparatuses may be spatially multiplexed and then transmitted.

According to the present invention, there is provided a base station apparatus in a wireless communication system in which the base station apparatus having a plurality of transmission antennas and one or more terminal apparatuses communicate with each other, and which includes at least two methods of a first feedback method and a second feedback method regarding propagation path information at the time of reception. The base station apparatus performs spatial multiplexing transmission on the basis of the propagation path information fed back from the terminal apparatus by one of the first feedback method and the second feedback method in accordance with a communication condition between the base station apparatus and the terminal apparatus or the function of the terminal apparatus.

There is provided a base station apparatus in a wireless communication system in which the base station apparatus having a plurality of transmission antennas and one or more terminal apparatuses communicate with each other. The base station notifies the terminal apparatus of band allocation information as a reference by which the terminal apparatus switches a feedback method regarding propagation path information at the time of reception between at least two methods.

According to the present invention, there is provided a terminal apparatus in a wireless communication system in which a base station apparatus having a plurality of transmission antennas and one or more terminal apparatuses communicate with each other, and which includes at least two methods of a first feedback method and a second feedback method regarding propagation path information at the time of reception. The terminal apparatus performs feedback by the first feedback method or the second feedback method in accordance with a communication condition between the base station apparatus and the terminal apparatus or the function of the terminal apparatus. The terminal apparatus prompts the base station apparatus to perform spatial multiplexing transmission on the basis of the propagation path information that is fed back.

There is provided a terminal apparatus in a wireless communication system in which a base station apparatus having a plurality of transmission antennas and one or more terminal apparatuses communicate with each other. The terminal apparatus includes at least two methods of a first feedback method and a second feedback method as feedback methods regarding propagation path information at the time of reception in accordance with a communication condition between the base station apparatus and the terminal apparatus or the function of the terminal apparatus.

According to another aspect of the present invention, a wireless communication method for a wireless communication system in which a base station apparatus having a plurality of transmission antennas and one or more terminal apparatuses communicate with each other, and which includes at least two methods of a first feedback method and a second feedback method regarding propagation path information at the time of reception. The wireless communication method includes the steps of: performing by the terminal apparatus feedback using one of the two methods of the first feedback method and the second feedback method in accordance with a communication condition between the base station apparatus and the terminal apparatus or the function of the terminal apparatus; and performing by the base station apparatus spatial multiplexing transmission on the basis of the propagation path information that is fed back.

This description incorporates the contents of the description and/or drawings of Japanese Patent Application No. 2010-229336, on which the priority of the present application is based.

Effects of the Invention

By using the present invention, a feedback method corresponding to a condition can be selected and used, whereby desired transmission characteristics can be efficiently obtained in a system in which CSI is fed back and MIMO transmission is performed.

MODE OF CARRYING OUT THE INVENTION

According to the present invention, in a MIMO transmission system in which CSI is fed back from the receiving side and precoding is performed on the basis of the CSI, explicit feedback or implicit feedback is appropriately selected depending on the communication condition between a transmission apparatus and a reception apparatus or the function of each apparatus so that desired transmission characteristics can be efficiently obtained. Explicit feedback is a method by which the result of measurement of a propagation path is fed back as the CSI and which requires a greater number of bits for feedback. Implicit feedback is a method by which information representing a vector that can be received with the most favorable characteristics is fed back from among precoding vector candidates that are known on the transmitting and receiving sides and which requires a smaller number of bits.

In the following embodiments, configurations of the present invention will be described in detail with reference mainly to downlink MU-MIMO transmission in which the influence on transmission characteristics depending on the difference in feedback method is greater. Namely, an apparatus that controls communication, such as a base station apparatus, provides the transmission apparatus that performs MIMO transmission, and a plurality of terminal apparatuses that perform communication with the base station apparatus provide reception apparatuses. In this case, CSI feedback is performed by each of the plurality of terminals. It should be noted, however, that the range of application of the present invention is not limited to downlink MU-MIMO transmission, but the present invention may be applied to any MIMO transmission technology involving feedback of CSI from the receiving side and precoding based on the CSI, including uplink MU-MIMO transmission, SU-MIMO transmission, network MIMO, and CoMP.

The present invention also relates to the switching of the CSI feedback method. The precoding method is not particularly limited and any precoding may be used as long as the precoding is performed on the basis of the CSI that is fed back by the switching on the receiving side. It should be noted, however, that in the case of MU-MIMO transmission, the terminal apparatuses that are spatially multiplexed in the same resource are terminal apparatuses that feed back CSI by the same method.

(First Embodiment)

Figure 2:
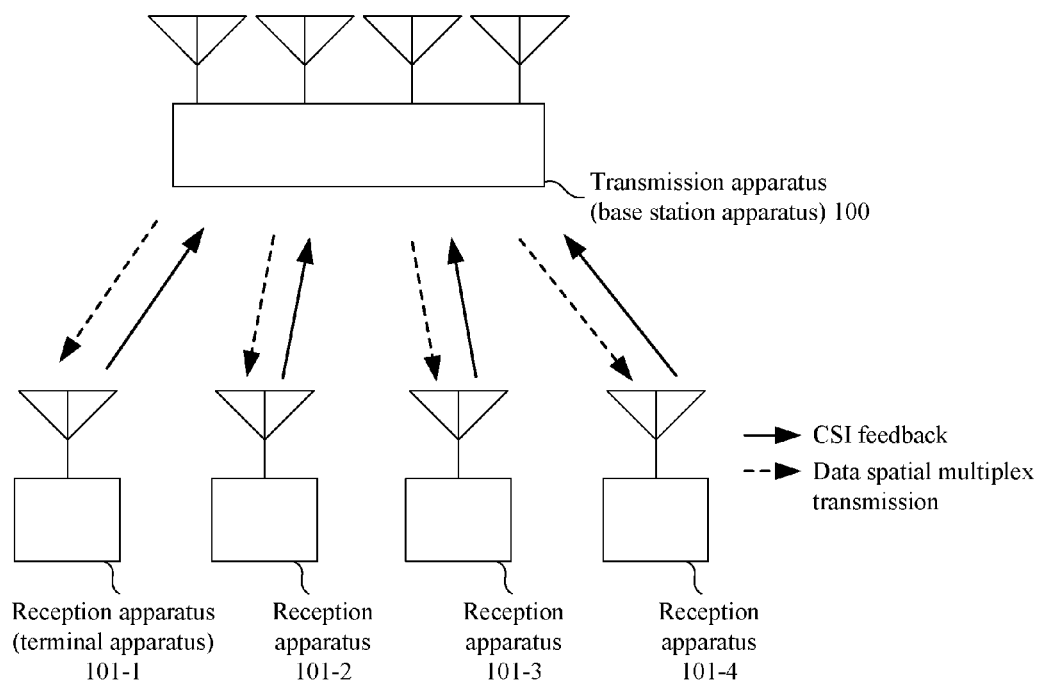
FIG. 2 illustrates an example in which, in a system that performs downlink MU-MIMO transmission, the two types of feedback method are switched depending on the band width (number of frequency channels) allocated for uplink transmission by each reception apparatus when CSI is fed back from a plurality of reception apparatuses (terminal apparatuses).

According to a first embodiment of the present invention, in a system provided with a plurality of frequency channels and including a transmission apparatus (base station apparatus) 100 and reception apparatuses (terminal apparatuses) 101-1 to 101-4 as depicted in FIG. 2 for performing downlink MU-MIMO transmission, the two types of feedback method mentioned above are switched depending on the band width (the number of frequency channels) allocated for uplink transmission by the reception apparatuses 101-1 to 101-4 when CSI is fed back from each of the plurality of reception apparatuses (terminal apparatuses) 101-1 to 101-4. This is in light of the fact that the band allocated for uplink transmission differs from one reception apparatus to another, and a reception apparatus with a wide allocated band width can transmit more information in uplink, whereas the amount of information that can be transmitted in uplink by a reception apparatus with a narrow allocated band width is limited, and that an increase in overhead by CSI feedback is not preferable. Specifically, when the band width allocated for uplink transmission is wider than a threshold value, a first feedback method (explicit feedback) is used by which precoding in accordance with the actual propagation path can be performed and by which the result of measurement of the propagation path is fed back as CSI, although the amount of feedback may be increased. On the other hand, when the band width allocated for uplink transmission is narrower than the threshold value, a second feedback method (implicit feedback) is used by which, although the accuracy of interference suppression by precoding is lowered a little, information indicating a vector that can be received with the most favorable characteristics from among precoding vector candidates is fed back, whereby the amount of feedback can be kept low. Thus, by switching the feedback method in accordance with the band width allocated for uplink transmission by each reception apparatus, the reception apparatus to which a wide band width is allocated can be subjected to spatial multiplexing based on the explicit feedback of CSI, whereby multi-user interference can be accurately suppressed and by which transmission characteristics can be improved. Further, by utilizing the implicit feedback with the suppressed amount of feedback, the reception apparatus to which a narrow band width is allocated can decrease uplink overhead and prevent a decrease in transmission efficiency.

Figure 3:
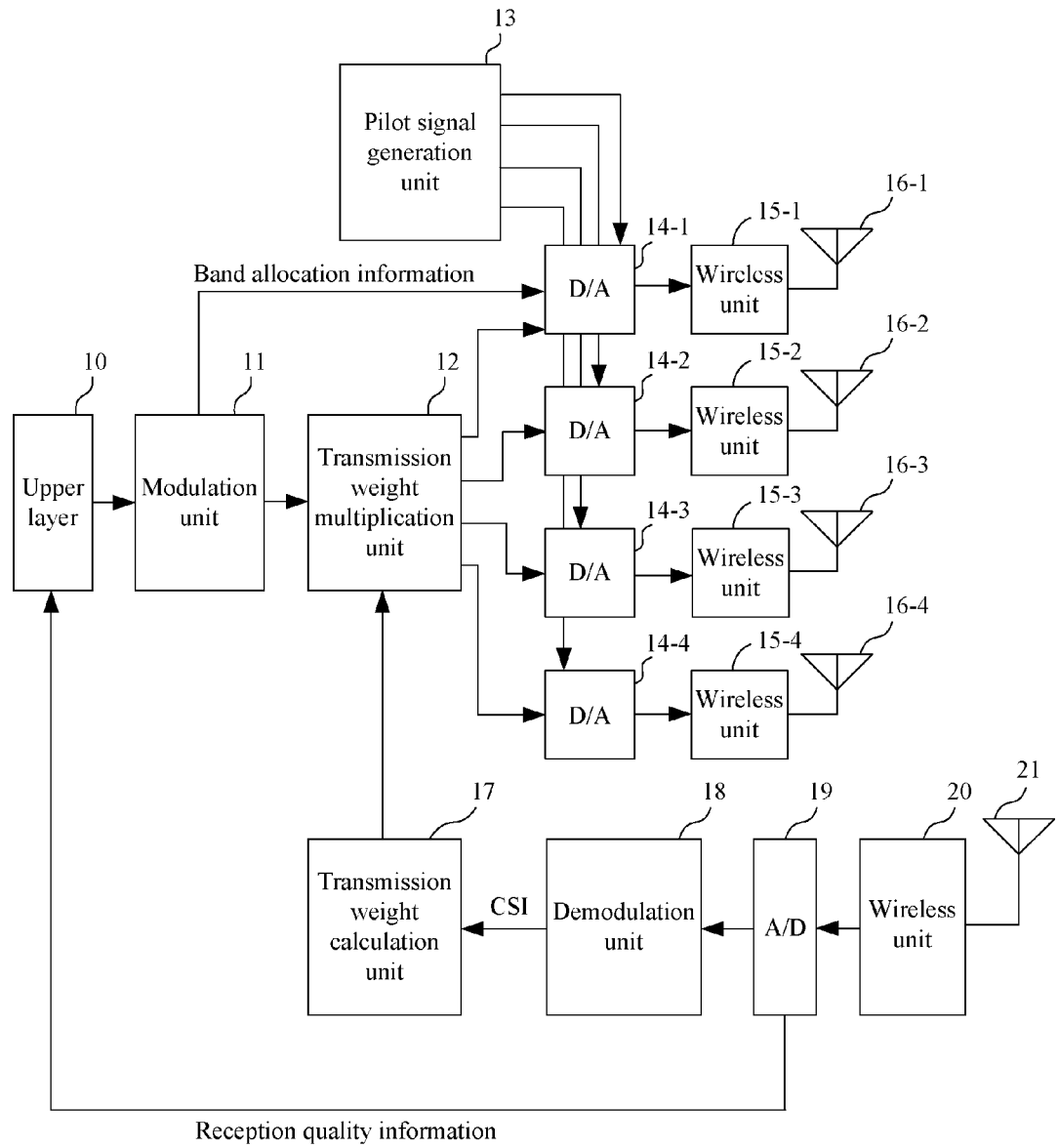
FIG. 3 is a functional block diagram of a configuration example of a base station apparatus (transmission apparatus) according to a first embodiment of the present invention.

FIG. 3 illustrates a configuration example of the base station apparatus (transmission apparatus) according to the present embodiment. As depicted in FIG. 3, the base station apparatus according to the present embodiment is provided with an upper layer 10, a modulation unit 11, a transmission weight multiplication unit 12, a pilot signal generation unit 13, D/A units 14-1 to 14-4, wireless units 15-1 to 15-4, transmission antenna units 16-1 to 16-4, a transmission weight calculation unit 17, a demodulation unit 18, an A/D unit 19, a wireless unit 20, and a reception antenna unit 21.

In the base station apparatus, a known pilot signal transmitted from the terminal apparatus (reception apparatus) side is received by the reception antenna unit 21, frequency-converted by the wireless unit 20 into a frequency band for A/D conversion, and then A/D converted by the A/D unit 19, whereby a digital signal is obtained. On the basis of the received pilot signal, the reception quality of each frequency channel is measured for each terminal apparatus. The result of measurement is sent to the upper layer 10, by which the uplink transmission band to be allocated to each terminal apparatus is determined. What width band is to be allocated to which terminal apparatus may be determined by any method. According to the present embodiment, the band is allocated to the terminals in descending order of the reception quality measured by the base station apparatus. In this case, the terminals with higher reception quality are allocated wider bands.

Thus, the allocated uplink transmission band is determined on a terminal apparatus basis, and band allocation information indicating the respective allocation is sent to each terminal apparatus. In the example of FIG. 3, the band allocation information is transmitted from only the transmission antenna unit 16-1 via the D/A unit 14-1 and the wireless unit 15-1 after modulation, such as QPSK or 16QAM, is performed by the modulation unit 11.

The base station apparatus also transmits a known pilot signal so as to allow each terminal apparatus to measure the propagation path at the time of reception of a signal by the terminal apparatus. According to the present embodiment, the pilot signal is generated by the pilot signal generation unit 13. After conversion from a digital signal into an analog signal by the D/A units 14-1 to 14-4, the pilot signal is frequency-converted by the wireless units 15-1 to 15-4 to a frequency band for wireless transmission, and then transmitted from the transmission antennas of the transmission antenna units 16-1 to 16-4. In order to accurately measure the propagation path between each transmission antenna of the base station apparatus and the reception antennas of the terminal apparatuses, the pilot signals are transmitted orthogonally in a time or frequency (sub-carrier in a multi-carrier transmission system) domain, for example, so as to prevent interference among the pilot signals transmitted from the transmission antennas. The pilot signals may be made orthogonal to each other by using an orthogonal code.

Thus, to each terminal apparatus, the information about the allocated uplink transmission band and the pilot signal for propagation path estimation are transmitted, and each terminal apparatus measures the propagation path by using the pilot signal, selects the CSI feedback method in accordance with the transmission band width, and performs CSI feedback. The details of the processing in the terminal apparatus will be described later. The base station apparatus receives the CSI fed back from each terminal apparatus, demodulates the CSI in the demodulation unit 18, and sends the CSI to the transmission weight calculation unit 17 in order to calculate a transmission weight necessary for performing MU-MIMO transmission. In the MU-MIMO transmission according to the present embodiment, the terminal apparatuses that are spatially multiplexed in the same resource are the terminal apparatuses that feed back the CSI by the same method, as mentioned above.

According to the present invention, the method of calculating the transmission weight is not particularly limited. For example, when the CSI is fed back from each terminal apparatus by explicit feedback, the ZF (Zero Forcing) method may be used by which a propagation path matrix is configured on the basis of the CSI and its inverse matrix is adopted as the transmission weight. Alternatively, a method by which the transmission weight is calculated according to a MMSE criterion may be used. Also, in a configuration which may be somewhat complex and in which the amount of calculation may be increased, spatial multiplexing using THP (Tomlinson-Harashima Precoding), which employs a non-linear operation referred to as a modulo arithmetic, may be performed. On the other hand, when the CSI is fed back by implicit feedback, spatial multiplexing may be performed by using the precoding vector indicated by the feedback information as is. Further, when the precoding vector selected by each terminal apparatus is sent by implicit feedback, the base station apparatus may newly calculate the transmission weight (precoding vector) according to a SLNR (Signal to Leakage plus Noise power Ratio) criterion on the basis of the received vector.

While the base station apparatus needs to distinguish and appropriately process the CSI fed back from the terminal apparatuses by different methods, it is the base station apparatus that allocates the uplink transmission band and therefore the base station can know in advance which terminal apparatus feeds back the CSI by which feedback method (explicit/implicit) at the time of making the allocation. Thus, even when the terminal apparatuses perform the feedback differently, the base station apparatus can distinguish and appropriately process the individual CSI. The base station apparatus can also determine to some extent which terminal apparatuses are to be combined for spatial multiplexing at the time of uplink transmission band allocation.

Thus, the transmission weight is calculated on the basis of the CSI that has been fed back, and the calculation result is sent to the transmission weight multiplication unit 12. The transmission weight multiplication unit 12 multiplies, by the transmission weight, a data signal that has been outputted from the upper layer 10 and modulated by the modulation unit 11 and that is addressed to each terminal apparatus. The data signal multiplied by the transmission weight is transmitted from the transmission antenna units 16-1 to 16-4 via the D/A units 14-1 to 14-4 and the wireless units 15-1 to 15-4. By adopting such configuration of the base station apparatus, the terminal apparatuses can be notified of the band allocation information that is the reference by which each terminal apparatus switches the feedback method, and also MU-MIMO transmission using the CSI that has been fed back from each terminal apparatus can be performed.

Figure 4:
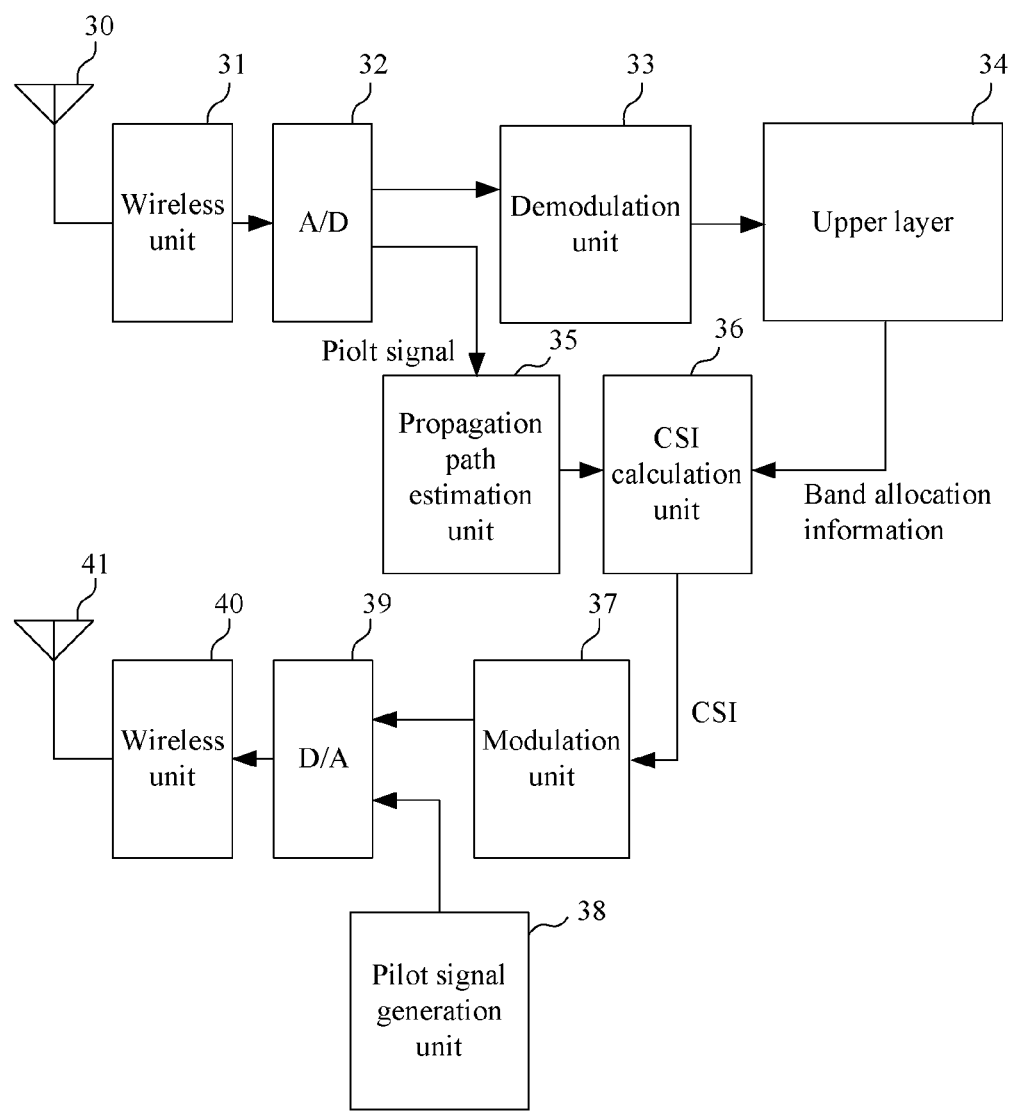
FIG. 4 is a functional block diagram of a configuration example of a terminal apparatus (reception apparatus) according to the present embodiment.

FIG. 4 is a functional block diagram of a configuration example of the terminal apparatus (reception apparatus) according to the present embodiment. As depicted in FIG. 4, the terminal apparatus according to the present embodiment includes a reception antenna unit 30, a wireless unit 31, an A/D unit 32, a demodulation unit 33, an upper layer 34, a propagation path estimation unit 35, a CSI calculation unit 36, a modulation unit 37, a pilot signal generation unit 38, a D/A unit 39, a wireless unit 40, and a transmission antenna unit 41.

As mentioned above, the terminal apparatuses according to the present embodiment first transmit a known pilot signal so as to allow the base station apparatus to measure the uplink reception quality. For example, the pilot signal is generated by the pilot signal generation unit 38, D/A-converted by the D/A unit 39, frequency-converted by the wireless unit 40 into a frequency band for wireless transmission, and then transmitted from the transmission antenna unit 41.

By using the pilot signal transmitted from the terminal apparatuses, the base station apparatus allocates the uplink transmission band to each terminal apparatus, and the result of allocation is sent to each terminal apparatus. In the terminal apparatus depicted in FIG. 4, the band allocation information transmitted from the base station is received by the reception antenna unit 30, and then demodulated by the demodulation unit 33 via the wireless unit 31 and the A/D unit 32. The demodulated band allocation information is sent to the upper layer so as to know the uplink transmission band allocated to the terminal apparatus.

As with the band allocation information, a pilot signal for measuring the downlink propagation path is also transmitted from the base station apparatus and received by each terminal apparatus. The received pilot signal is sent to the propagation path estimation unit 35 for estimation of the propagation path by using the known signal. The propagation path estimated by the propagation path estimation unit 35 and the band allocation information are sent to the CSI calculation unit 36. When the uplink band width indicated by the band allocation information and allocated to the terminal apparatus is wider than a threshold value, the CSI calculation unit 36 decides on CSI feedback by explicit feedback. Conversely, when the uplink band width allocated to the terminal apparatus is narrower than the threshold value, the CSI calculation unit 36 decides on CSI feedback by implicit feedback. Thereafter, the CSI calculation unit 36 calculates CSI for actual feedback in accordance with the propagation path estimated by the propagation path estimation unit 35 and the previously determined type of feedback.

Figure 1:
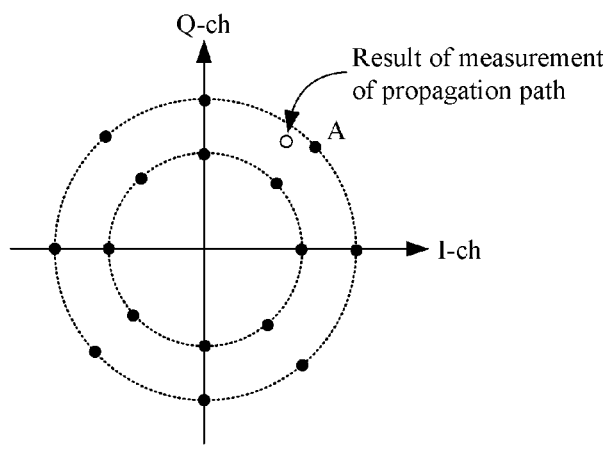
FIG. 1 illustrates a CSI feedback method by which the result of measurement of a propagation path is fed back as CSI (explicit feedback).

The present invention relates to the switching of feedback type and is not particularly limited as regards the detailed method for calculating the CSI. For example, when explicit feedback is performed, a method is used by which a point that is the closest to the estimated propagation path is calculated from among candidates, such as depicted in FIG. 1. When implicit feedback is performed, a method may be used by which the precoding vectors such as represented by the predetermined expression (1) are multiplied by the estimated propagation path, a precoding vector that maximizes the norm (i.e., high SNR can be obtained) is selected, and the index for the precoding vector is calculated as the CSI. This is a method by which, for example, the vector for feedback is selected according to the following expression (3), where $p_i$ (i=1, 2, . . . ) is the precoding vector and H is the propagation path matrix measured by the reception apparatus. The CSI calculated by such a method is sent to the modulation unit 37, and then is modulated. The modulated CSI is transmitted from the transmission antenna unit 41 to the base station apparatus via the D/A unit 39 and the wireless unit 40.

$$\underset{p_i}{\operatorname{argmax}} \|Hp_i\| \qquad (3)$$

By using the CSI that has been fed back from each terminal apparatus, the base station apparatus transmits a spatially multiplexed data signal. The data signal is received by the terminal apparatus via the reception antenna unit 30 and demodulated by the demodulation unit 33 via the wireless unit 31 and the A/D unit 32, whereby the desired data signal is obtained.

By adopting the above configuration for the terminal apparatus, the CSI feedback method can be switched in accordance with the uplink transmission band allocated to the terminal apparatus. Thus, by performing explicit feedback, the reception apparatus to which a wide band width is allocated can receive the data signal in which multi-user interference is accurately suppressed. The reception apparatus to which a narrow band width is allocated can decrease the overhead for CSI feedback by performing implicit feedback, so that a decrease in transmission efficiency can be prevented. Namely, by performing the switching appropriately depending on whether high transmission characteristics should be obtained or the amount of feedback should be decreased, the transmission efficiency of the system as a whole can be increased.

(Second Embodiment)

According to the first embodiment, an example in which the CSI feedback method is switched depending on the uplink transmission band width allocated to each terminal apparatus has been described. According to the present embodiment, an example will be described in which the feedback method is switched depending on which band is used (the level of frequency; i.e., which "component carrier", as the central frequency of a band may be called, is to be used) for actual MIMO transmission. For example, in a system in which one of a 800 MHz band and a 1.9 GHz band can be selected or the two bands can be simultaneously used for transmission, i.e., a system in which any one of a plurality of separate frequency bands is selected or some of the bands are combined and used simultaneously for transmission, the feedback method is switched on a band by band basis.

The base station apparatus and the terminal apparatus according to the present embodiment can be implemented in substantially the same configuration as the configuration of the first embodiment. It should be noted, however, that while the first embodiment only mentioned allocation regarding the uplink transmission band, according to the second embodiment it is also necessary for the base station apparatus to determine allocation regarding the downlink transmission band and notify each terminal apparatus. Each of the terminal apparatuses has a configuration in which the propagation path estimation unit 35 estimates the propagation path for each downlink transmission band allocated to its own terminal apparatus, and the CSI calculation unit 36 determines the feedback method for each transmission band allocated to its own terminal apparatus.

Thus, when the feedback method is selected on the allocated band basis, a reference for the selection is required. According to the present embodiment, when the allocated frequency band (such as the 1.9 GHz band) is higher than the threshold value, implicit feedback is selected; when the allocated frequency band (such as the 800 MHz band) is lower than the threshold value, explicit feedback is selected. This is in light of the fact that the amount of decay during propagation at high frequencies is greater than at low frequencies, so that the characteristics are not much improved by performing explicit feedback for MIMO transmission with high quality. Thus, when the allocated frequency band is high, it is more efficient to select implicit feedback and thereby decrease the overhead rather than selecting explicit feedback which requires a greater amount of feedback. Accordingly, by performing the selection and switching of the feedback method in accordance with the allocated band according to the present embodiment, efficient MIMO transmission in which the trade-off between transmission characteristics and the amount of feedback is taken into consideration can be implemented.

While the configuration of the base station apparatus and the terminal apparatus according to the present embodiment is directed only to downlink MIMO transmission, the configuration may also be directed to uplink. For example, an FDD system, in which the frequencies used for uplink and downlink are different, may be configured such that when CSI feedback is performed from the terminal apparatus to the base station apparatus in an uplink band, explicit feedback is performed to implement highly accurate downlink MIMO transmission, while when CSI feedback is performed from the base station apparatus to the terminal apparatus in a downlink band, implicit feedback is performed to obtain a certain level of transmission characteristics while decreasing overhead. This is in light of the fact that, particularly when MU-MIMO transmission is performed, multi-user interference needs to be highly accurately suppressed for downlink MU-MIMO transmission, whereas for uplink MU-MIMO transmission, the base station apparatus is the receiving side where a somewhat complicated signal processing can be performed, so that there is less need to suppress multi-user interference by precoding.

(Third Embodiment)

According to the present embodiment, an example in which the feedback method is switched depending on the distance between the base station apparatus and each terminal apparatus will be described. This is in light of the fact that a terminal apparatus located in the vicinity of the base station apparatus has very high reception quality such that very high-quality and high-speed transmission can be realized by performing explicit feedback and transmission with highly accurate spatial multiplexing. On the other hand, a terminal apparatus located around a cell edge has low reception quality and not much increase in transmission speed can be expected even when highly accurate spatial multiplexing is performed, so that it is more efficient to perform implicit feedback to decrease overhead while a certain level of transmission characteristics are obtained.

Figure 5:
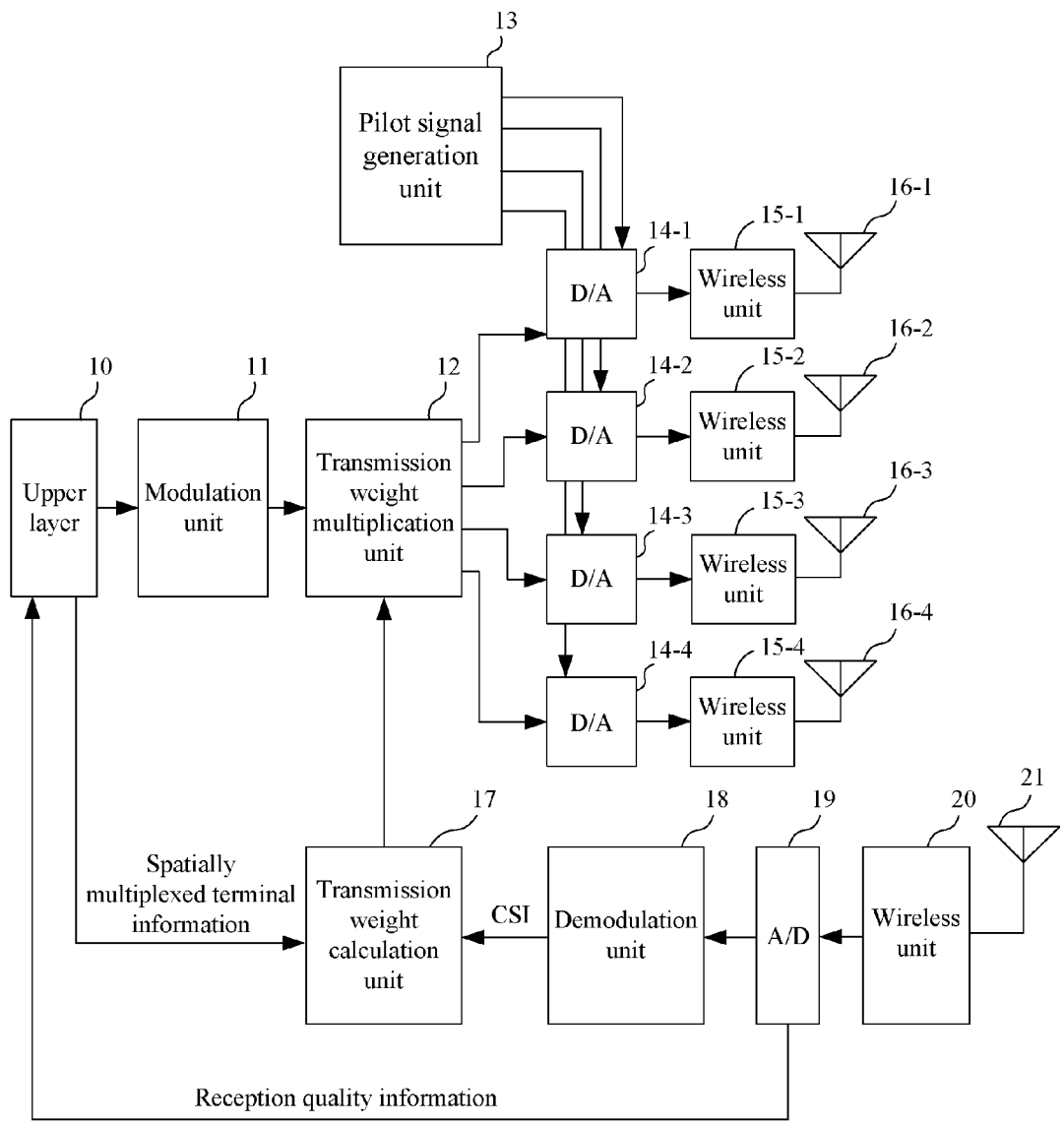
FIG. 5 is a functional block diagram of a configuration example of the base station apparatus (transmission apparatus) according to a third embodiment of the present invention.

FIG. 5 depicts a configuration example of the base station apparatus in this case. The base station apparatus depicted in FIG. 5 has substantially the same configuration as that of the base station apparatus depicted in FIG. 3. The configuration of FIG. 5 differs from that of FIG. 3 in that CSI and information about reception quality (such as the average SINR in each terminal apparatus) are received from the terminal apparatus. Thus, when the information about reception quality fed back from each terminal apparatus is received and when the reception quality is high, it is determined that the terminal apparatus is located in the vicinity of the base station apparatus. Conversely, when the reception quality is low, it is determined that the terminal apparatus is located around the cell edge. This determination is made in the upper layer 10. The upper layer 10 selects the terminal apparatuses located at approximately the same distance (the terminal apparatuses located in the vicinity of the base station apparatus, or the terminal apparatuses located around the cell edge; namely, the terminal apparatuses that feed back the CSI by the same feedback method), and determines that the selected terminal apparatuses are the ones for spatial multiplexing and transmission in the same resource. Thus, the terminal apparatuses for spatial multiplexing are selected and information about the selected terminal apparatuses is sent from the upper layer 10 to the transmission weight calculation unit 17 as spatial multiplexing terminal information.

From the CSI that has been fed back from the plurality of terminal apparatuses, the transmission weight calculation unit 17 selects the CSI for the plurality of terminal apparatuses to be spatially multiplexed on the basis of the spatial multiplexing terminal information sent from the upper layer 10, and calculates a transmission weight by using the selected CSI. The calculated transmission weight is sent to the transmission weight multiplication unit 12, and then is multiplied by a modulation signal to generate a transmission signal. By performing such processing, when the terminal apparatuses switch the feedback method to explicit feedback or implicit feedback depending on the distance from the base station, spatial multiplexing appropriately using the CSI that has been fed back can be performed.

Figure 6:
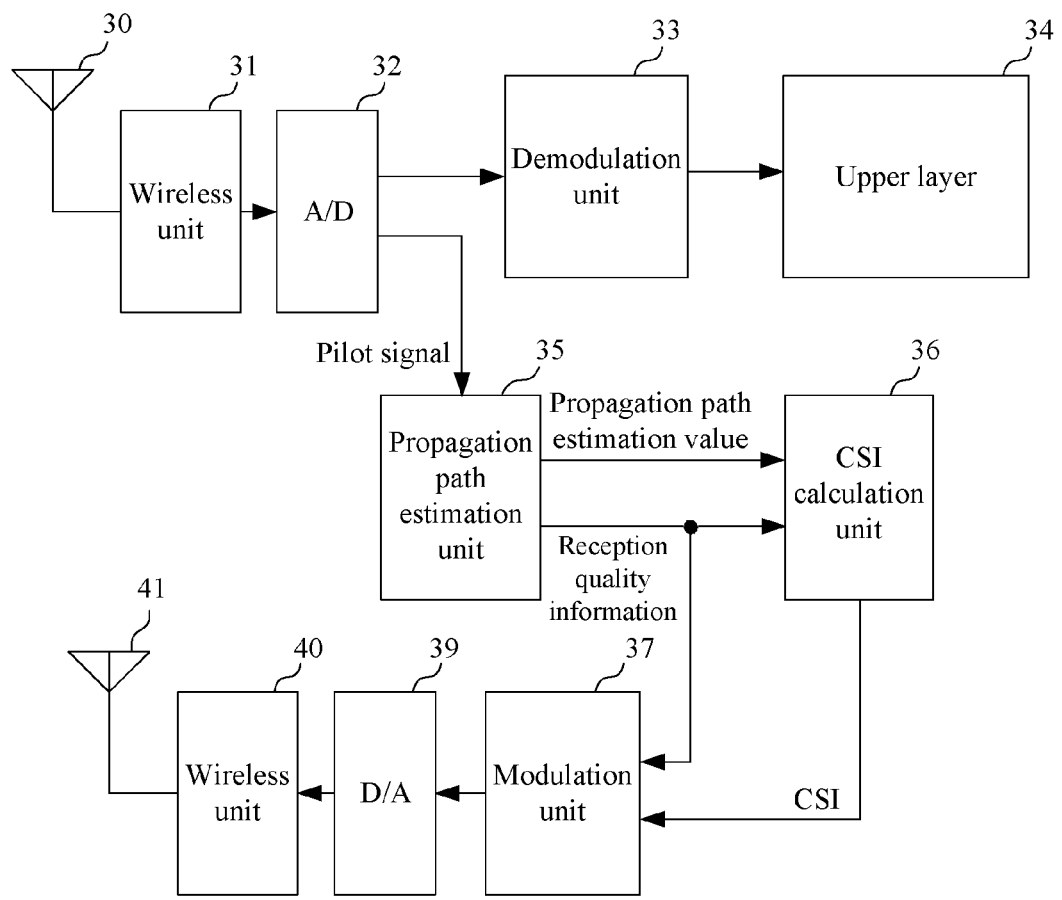
FIG. 6 is a functional block diagram of a configuration example of the terminal apparatus (reception apparatus) according to the present embodiment.

FIG. 6 is a functional block diagram of a configuration example of the terminal apparatus according to the present embodiment. As depicted in FIG. 6, in the terminal apparatus according to the present embodiment, not only the propagation path estimation value but also reception quality is measured by the propagation path estimation unit 35 by using the pilot signal transmitted from the base station apparatus, and the measured reception quality information is sent to the CSI calculation unit 36 and the modulation unit 37. The CSI calculation unit 36 determines whether explicit feedback or implicit feedback is to be performed on the basis of the reception quality information. Specifically, when the reception quality information is higher than a predetermined threshold value, it is determined that explicit feedback is to be performed, whereas when the reception quality information is lower than the threshold value, it is determined that implicit feedback is to be performed. The CSI is calculated by using the propagation path estimation value, as described in the first embodiment, and the calculated CSI is fed back to the base station apparatus. The information about the reception quality measured by the propagation path estimation unit 35 is also modulated by the modulation unit 37 and fed back to the base station apparatus.

In the above configuration, the terminal apparatuses that are located at approximately the same distance and that are to be spatially multiplexed in the same resource are selected on the basis of the reception quality information fed back from each terminal apparatus. However, according to the present invention, it is important to spatially multiplex in the same resource the terminal apparatuses that have performed CSI feedback by the same feedback method. Thus, the terminal apparatuses may be selected in accordance with the type of CSI that has been fed back without using the reception quality information.

By adopting the above configuration, the feedback method can be switched depending on the distance between the base station apparatus and each terminal apparatus. Thus, MIMO transmission can be performed efficiently in accordance with a condition.

(Fourth Embodiment)

According to the present embodiment, an example in which the feedback method is switched depending on the moving speed of each terminal apparatus will be described. Generally, the propagation path for each terminal apparatus varies depending on the moving speed. Thus, even if highly accurate spatial multiplexing based on explicit feedback is performed for a terminal apparatus that is moving at a relatively high-speed, the transmission characteristics may be greatly degraded by the variation in the propagation path at the time of feedback and at the time of spatial multiplexing transmission. Thus, it may be more efficient to perform implicit feedback, rather than explicit feedback, for the high-speed mobile terminal, so that the overhead for feedback can be decreased while a certain level of transmission characteristics is ensured. On the other hand, for a terminal apparatus that is in low-speed movement state or semi-stationary state, for example, there is not much difference in the propagation path at the time of feedback and at the time of spatial multiplexing transmission, so that highly favorable transmission characteristics may be obtained by performing the highly accurate spatial multiplexing based on explicit feedback. Thus, according to the present embodiment, the moving speed of each terminal apparatus is detected, the terminal apparatus that is moving at high speed performs implicit feedback while the terminal apparatus moving at low speed performs explicit feedback, and MIMO transmission is performed on the basis of the respective CSI that has been fed back.

The base station apparatus according to such a mode can be realized by the same configuration as in FIG. 5. It should be noted, however, that according to the present embodiment, the information indicating the presence or absence of high-speed movement is fed back from each terminal apparatus, so that it is necessary to notify the upper layer 10 about the speed information instead of the reception quality information as in FIG. 5. The upper layer 10 selects from among the plurality of terminal apparatuses the high-speed mobile terminals or low-speed mobile terminals (i.e., the terminal apparatuses that feed back the CSI by the same feedback method), and determines the selected mobile terminals as the ones for spatial multiplexing and transmission in the same resource. Thus, the terminal apparatuses for spatial multiplexing are selected, and information about the selected plurality of terminal apparatuses is sent from the upper layer 10 to the transmission weight calculation unit 17 as the spatial multiplexing terminal information.

From the CSI that has been fed back from the plurality of terminal apparatuses, the transmission weight calculation unit 17 selects the CSI of the plurality of terminal apparatuses to be spatially multiplexed on the basis of the spatial multiplexing terminal information sent from the upper layer 10, and calculates a transmission weight by using the selected CSI. The calculated transmission weight is sent to the transmission weight multiplication unit 12 where the transmission weight is multiplied by the modulation signal to generate a transmission signal. By such processing, when the feedback method is switched to explicit feedback or implicit feedback depending on the moving speed of each terminal apparatus, spatial multiplexing appropriately using the CSI that has been fed back can be performed.

Figure 7:
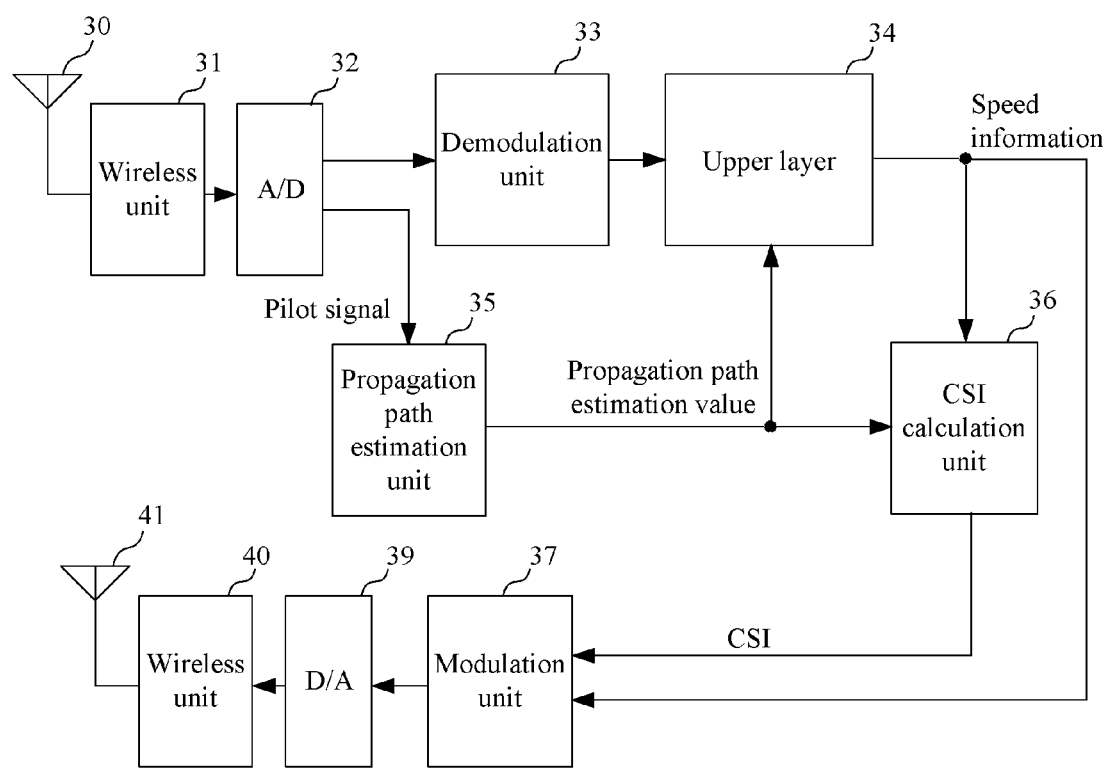
FIG. 7 is a functional block diagram of a configuration example of the terminal apparatus (reception apparatus) according to a fourth embodiment of the present invention.

FIG. 7 depicts a configuration of the terminal apparatus according to the present embodiment. As depicted in FIG. 7, in the terminal apparatus according to the present embodiment, the propagation path estimation value estimated by using the pilot signal transmitted from the base station apparatus is sent to the upper layer 34 and stored for one point in time. The propagation path estimation value thus stored and the propagation path estimation value estimated at the next point in time are compared by the upper layer 34 to calculate information about the moving speed in accordance with the amount of variation. Specifically, a correlation between the propagation path estimation value for a previous point in time and the propagation path estimation value for the next point in time is calculated. When the correlation value is less than a threshold value, it is determined that there is high-speed movement. Conversely, it is determined that there is low-speed movement when the correlation value is not less than the threshold value. In this way, information indicating the presence or absence of high-speed movement (speed information) can be generated. The speed information thus generated is sent to the CSI calculation unit 36. The CSI calculation unit 36 determines, on the basis of the speed information, whether explicit feedback or implicit feedback should be performed. Specifically, it is determined that explicit feedback should be performed when the speed information indicates low-speed movement, or that implicit feedback should be performed when the speed information indicates high-speed movement. Then, the CSI is calculated by using the propagation path estimation value as described with reference to the first embodiment, and the calculated CSI is fed back to the base station apparatus. The speed information is also modulated by the modulation unit 37 and fed back to the base station apparatus, where the speed information is used for selecting the terminals for spatial multiplexing.

While in the above configuration the terminal apparatuses to be spatially multiplexed in the same resource are selected on the basis of the speed information fed back from each terminal apparatus, it is important for the present invention to spatially multiplex in the same resource the terminal apparatuses that have performed CSI feedback by the same feedback method. Thus, the terminal apparatuses may be selected in accordance with the type of CSI that has been fed back, without using the speed information. Further, while in the above configuration it is determined in each terminal apparatus whether the moving speed is high speed or low speed by calculating the correlation of the propagation path estimation values estimated at two points in time, the information about moving speed may be calculated by using other means. For example, when each terminal apparatus is provided with a GPS function, the moving speed may be calculated by utilizing that function.

By adopting the above configuration, it becomes possible to switch the feedback method depending on the moving speed of each terminal apparatus. Thus, efficient MIMO transmission can be performed in accordance with a condition.

(Fifth Embodiment)

According to the present embodiment, an example in which the feedback method is switched in accordance with the frequency selectivity of the propagation path for each terminal apparatus will be described. This is in light of the fact that in a condition in which the frequency selectivity of the propagation path is severe, the transmission characteristics are greatly degraded unless highly accurate spatial multiplexing based on explicit feedback is performed, whereas in a condition in which the frequency selectivity is moderate, a certain level of transmission characteristics can be ensured even when spatial multiplexing based on implicit feedback is performed. Thus, according to the present embodiment, information about the frequency selectivity of the propagation path for each terminal apparatus is detected. Then, the terminal apparatus with moderate frequency selectivity performs implicit feedback, while the terminal apparatus with severe frequency selectivity performs explicit feedback, and MIMO transmission is performed on the basis of the respective CSI that has been fed back.

The base station apparatus in such mode can be implemented by the same configuration as in FIG. 5. It should be noted, however, that according to the present embodiment, the information indicating whether the frequency selectivity of the propagation path in each terminal apparatus is severe or not is fed back, so that the upper layer 10 needs to be notified of the selectivity information, instead of the reception quality information as in FIG. 5. The upper layer 10 selects from among the plurality of terminal apparatuses the terminals determined to have severe frequency selectivity, or the terminal apparatuses determined to have moderate frequency selectivity (namely, the terminal apparatuses that feed back the CSI by the same feedback method), and determines that the selected terminal apparatuses are the ones for spatial multiplexing and transmission in the same resource. Thus, the terminal apparatuses for spatial multiplexing are selected, and the information about the selected plurality of terminal apparatuses is sent from the upper layer 10 to the transmission weight calculation unit 17 as the spatial multiplexing terminal information.

The transmission weight calculation unit 17 selects, from among the CSI that has been fed back from the plurality of terminal apparatuses, the CSI of the plurality of terminal apparatuses to be spatially multiplexed on the basis of the spatial multiplexing terminal information sent from the upper layer 10, and calculates a transmission weight by using the selected CSI. The calculated transmission weight is sent to the transmission weight multiplication unit 12, where the transmission weight is multiplied by the modulation signal to generate a transmission signal. By performing such processing, when the feedback method is switched to explicit feedback or implicit feedback depending on the frequency selectivity of the propagation path for each terminal apparatus, it becomes possible to perform spatial multiplexing appropriately using the CSI that has been fed back.

Figure 8:
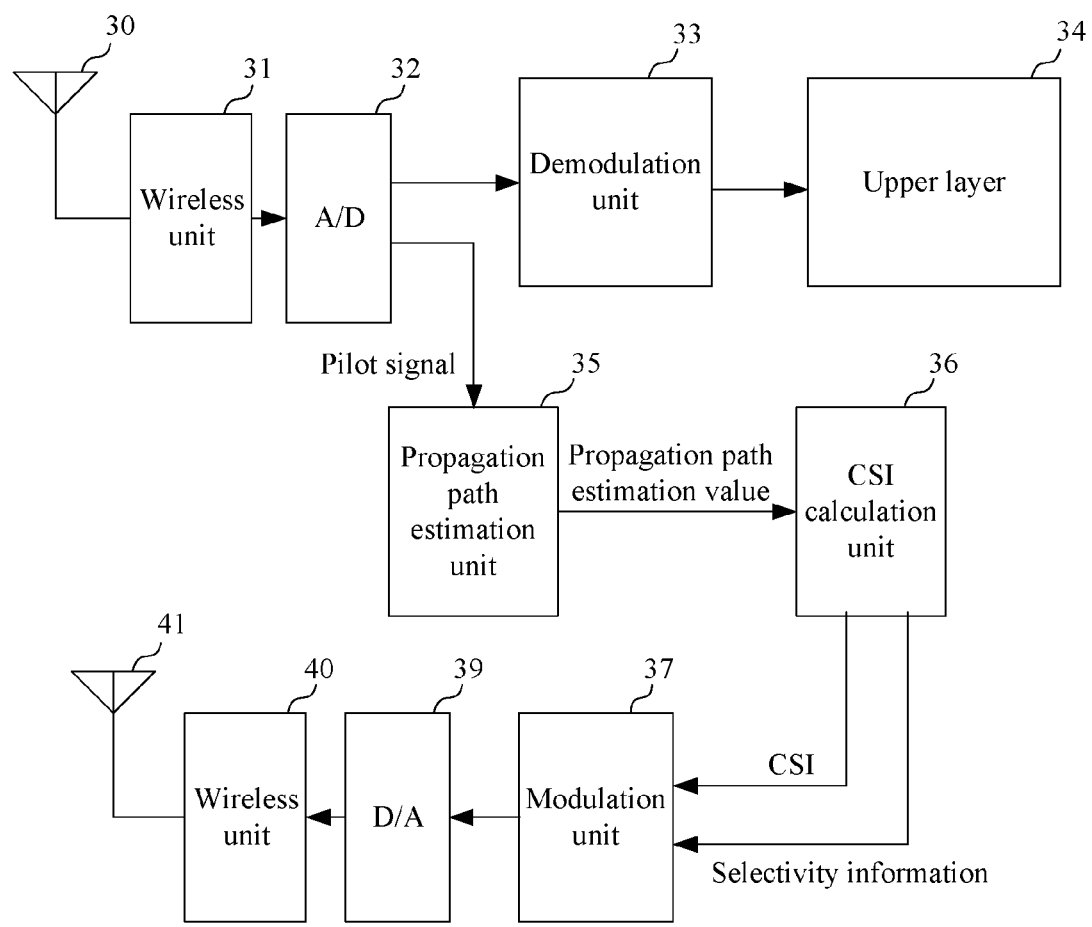
FIG. 8 is a functional block diagram of a configuration example of the terminal apparatus (reception apparatus) according to a fifth embodiment of the present invention.

FIG. 8 depicts a configuration example of the terminal apparatus according to the present embodiment. As depicted in FIG. 8, in the terminal apparatus according to the present embodiment, the propagation path estimation value estimated by using the pilot signal transmitted from the base station apparatus is sent to the CSI calculation unit 36, and the CSI calculation unit 36 calculates the frequency selectivity of the propagation path and CSI. The frequency selectivity of the propagation path can be determined by calculating the difference in propagation paths for adjacent sub-carriers, for example. This is because it can be determined that the frequency selectivity is severe when the difference in the propagation paths for the adjacent sub-carriers is greater than a threshold value, or that the frequency selectivity is moderate when the propagation path difference is smaller than the threshold value. On the basis of the selectivity information thus generated, the CSI calculation unit 36 determines whether explicit feedback or implicit feedback should be performed. Specifically, it is determined that explicit feedback should be performed when the selectivity information indicates a severe propagation path variation, or that implicit feedback should be performed when the selectivity information indicates a moderate propagation path variation. Then, the CSI is calculated by using the propagation path estimation value as described with reference to the first embodiment, and the calculated CSI is fed back to the base station apparatus. The selectivity information is also modulated by the modulation unit 37 and fed back to the base station apparatus to be used in selecting the terminals for spatial multiplexing.

While in the above configuration the terminal apparatuses to be spatially multiplexed in the same resource are selected on the basis of the selectivity information fed back from each terminal apparatus, it is important for the present invention to spatially multiplex in the same resource the terminal apparatuses that have performed CSI feedback by the same feedback method. Thus, the terminal apparatuses may be selected in accordance with the type of CSI that has been fed back, without using the selectivity information. Further, the frequency selectivity for each terminal apparatus may be determined by a method different from the method according to the present embodiment.

By adopting the above configuration, it becomes possible to switch the feedback method depending on the frequency selectivity of the propagation path for each terminal apparatus. Thus, efficient MIMO transmission can be performed in accordance with a condition.

(Sixth Embodiment)

Figure 9:
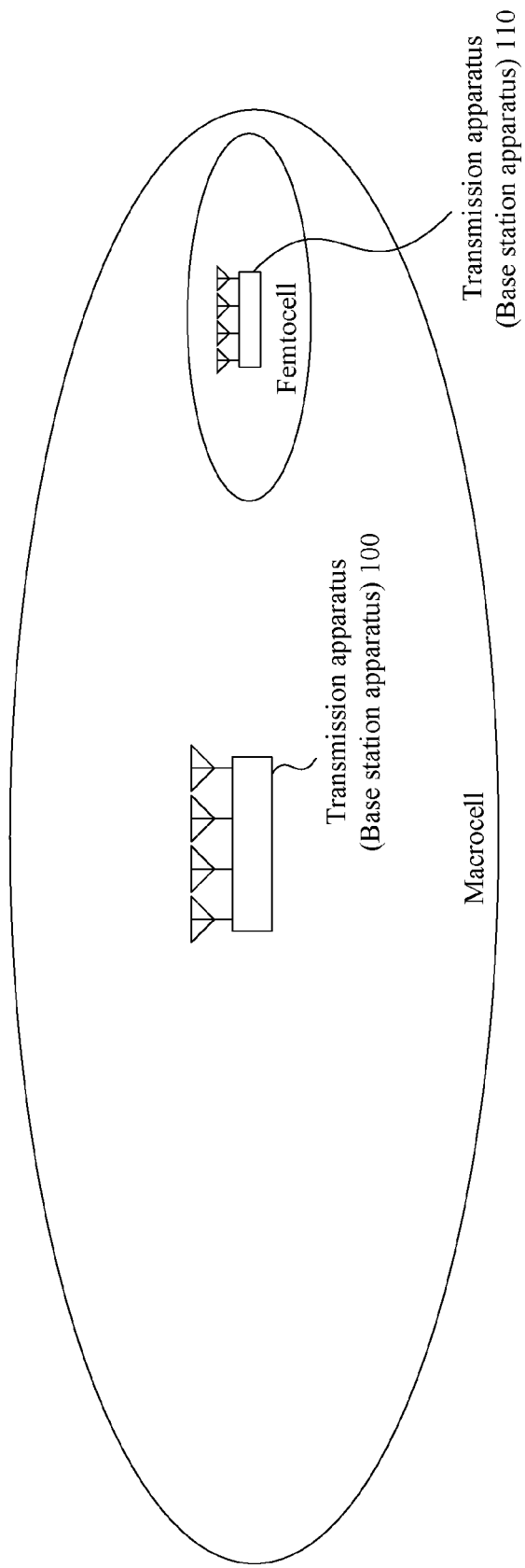
FIG. 9 illustrates an example in which each terminal apparatus switches the CSI feedback method depending on the counterpart of communication (base station apparatus) according to a sixth embodiment of the present invention, where the switching depending on the base station apparatus as the counterpart of communication involves switching depending on whether the counterpart of communication is a macrocell base station apparatus or a femtocell base station apparatus, for example.

According to the present embodiment, an example in which the CSI feedback method is switched by each terminal apparatus depending on the counterpart of communication (base station apparatus) will be described. The switching depending on the base station apparatus as the counterpart of communication means that, as illustrated in FIG. 9, the switching is performed depending on whether the counterpart of communication is a macrocell base station apparatus 100 or a femtocell base station apparatus 110, for example. Generally, the femtocell base station apparatus 110 is provided in a radio wave blind zone, such as a house or office, where radio waves from the macrocell base station apparatus 100 tend to fail to reach. While the main purpose of the femtocell base station apparatus 110 is the elimination of the radio wave blind zone, installation of the femtocell also enables the dispersion of the traffic that may be concentrated in the macrocell base station apparatus. Thus, the femtocell may be considered a highly promising technology for increasing the speed of the system as a whole.

The terminal apparatuses connected to the base station apparatus constituting the femtocell (the base station apparatus 110 in FIG. 9) are normally in semi-stationary state and have a small cell zone, so that relatively stable and high reception quality is in many cases obtained. Thus, it can be said that, as will be seen from the third and fourth embodiments, the condition is such that highly favorable transmission characteristics can be obtained for the terminal apparatuses connected to the femtocell by performing spatial multiplexing based on highly accurate CSI feedback. Thus, according to the present embodiment, the feedback method is switched to explicit feedback when connecting to the femtocell or to implicit feedback when connecting to the macrocell. While the above description has been concerned only with the femtocell, the present embodiment may also be applied to other small-zone cells, such as a picocell or a hotspot. Further, a relay station apparatus with high functionality can be operated similarly to a base station apparatus, so that explicit feedback may be performed when communicating with such a relay station apparatus.

Figure 10:
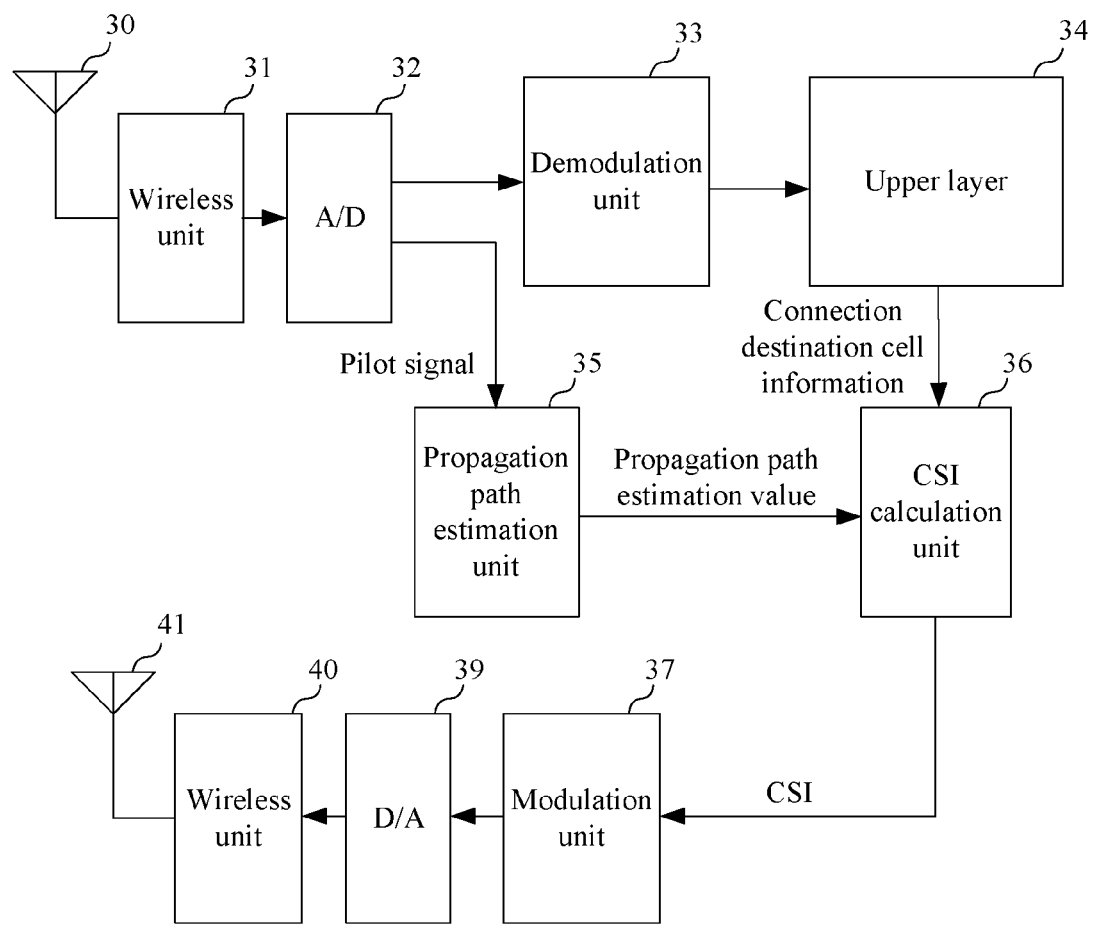
FIG. 10 is a functional block diagram of a configuration example of the terminal apparatus (reception apparatus) according to the sixth embodiment of the present invention.

FIG. 10 depicts a configuration example of the terminal apparatus according to the present embodiment. As depicted in FIG. 10, the terminal apparatus according to the present embodiment sends cell information received from the base station apparatus as a connection destination to the CSI calculation unit 36, and determines, on the basis of the cell information, whether explicit feedback or implicit feedback should be performed. The cell information sent from the base station apparatus as the connection destination refers to information indicating whether the base station apparatus as the connection destination is a base station apparatus that constitutes a macrocell or a base station apparatus that constitutes a femtocell. Instead of the information explicitly indicating a macrocell or a femtocell, the feedback method may be determined on the basis of information such as a cell ID, depending on the system. As mentioned above, according to the present embodiment, the CSI calculation unit 36 determines that explicit feedback should be performed when the connection destination is a femtocell, or implicit feedback should be performed when the connection destination is a macrocell.

To the base station apparatus according to the present embodiment, the CSI is fed back from each terminal apparatus by implicit feedback when the base station apparatus is a macrocell base station apparatus, or the CSI is fed back from each terminal apparatus by explicit feedback when the base station apparatus is a femtocell base station apparatus. Thus, the base station apparatus may perform spatial multiplexing based on the CSI that has been fed back.

(Seventh Embodiment)

According to the present embodiment, an example in which the CSI feedback method is switched depending on a difference in function of each terminal apparatus will be described. The "difference in function of each terminal apparatus" refers to whether the terminal apparatus is adapted to a new system or the terminal apparatus is adapted only to an old system. For example, the new system and the old system according to present embodiment refer to LTE-Advanced and LTE, respectively, which are being standardized by the 3GPP. The new system is intended to refer to a system which has various new functions and yet for which backward compatibility with the old system is ensured.

In a possible condition in which the base station apparatus is adapted to the new system but the terminal apparatuses connected to the base station apparatus include both terminal apparatuses adapted to the new system and terminal apparatuses only adapted to the old system, the CSI feedback method is switched. Specifically, when the terminal apparatus is adapted to the new system, explicit feedback is performed; when the terminal apparatus is only adapted to the old system, implicit feedback is performed. In this case, each terminal apparatus performs either one or the other feedback in accordance with the function of its own terminal apparatus, and the base station apparatus exerts control such that the terminals that have performed feedback by the same method (i.e., the terminals adapted to the new system or the terminals adapted to the old system) are spatially multiplexed. Such base station apparatus can be implemented by using terminal function information instead of the reception quality information in the configuration of FIG. 5.

When spatial multiplexing transmission is performed in uplink, the base station apparatus performs CSI feedback to each terminal apparatus. When the terminal apparatuses for the new system and the old system are mixed, the base station apparatus may also switch the feedback method depending on the function of each terminal apparatus. The information about the function of each terminal apparatus is often transmitted as information called "terminal category" at the start of communication. Thus, the base station apparatus can easily know the information about the function of each terminal apparatus, so that the feedback method can be switched on the basis of the information.

The CSI feedback method may be switched depending not on the difference in terms of the new system or the old system but on the difference as to whether each terminal apparatus has a superior interference cancel function or not. This is in light of the fact that the terminal apparatus with a superior interference cancel function can cancel multi-user interference and the like by utilizing the interference cancel function, without performing highly accurate spatial multiplexing on the transmitting side. On the other hand, for the terminal apparatus without such interference cancel function, the transmission characteristics may be significantly degraded unless transmission is performed by performing highly accurate spatial multiplexing on the transmitting side and removing multi-user interference and the like in advance. Thus, for the terminal apparatus with the interference cancel function, spatial multiplexing based on implicit feedback is performed, while for the terminal apparatus without the interference cancel function, spatial multiplexing based on explicit feedback is performed. Accordingly, the terminal apparatus with the interference cancel function performs implicit feedback, and the terminal apparatus without the interference cancel function performs explicit feedback. In this case, too, as mentioned above, the base station apparatus can be implemented by using the information about the function of the terminal apparatus instead of the reception quality information in the configuration of FIG. 5.

Thus, by switching the CSI feedback method depending on what function each terminal apparatus for spatial multiplexing has, and by performing spatial multiplexing on the basis of the CSI that has been fed back, more efficient transmission can be performed, whereby the transmission efficiency of the system as a whole can be increased.

A program operated in the terminal apparatus or the base station apparatus according to the present invention is a program that controls a CPU and the like (a program causing a computer to function) so as to implement the functions of the foregoing embodiments of the present invention. Information handled in these apparatuses may be temporarily saved in a RAM during a process, and then stored in various types of a ROM or a HDD, read by the CPU as needed, modified or written. The program may be stored in a recording medium, such as a semiconductor medium (such as a ROM or a nonvolatile memory card), or an optical recording medium (such as a DVD, an MO, an MD, a CD, or a BD), a magnetic recording medium (such as a magnetic tape or a flexible disc). Not only the functions of the foregoing embodiments may be implemented by executing the loaded program, but also the functions of the present invention may be implemented by executing processes in accordance with an instruction from the program and in cooperation with an operating system or other application programs, for example.

The program may be distributed in the market by storing the program in a portable recording medium or transferring the program to a server computer connected via a network such as the Internet. In this case, a storage device of the server computer is included in the present invention. The terminal apparatus and the base station apparatus according to the foregoing embodiments may be partially or entirely implemented by LSI, typically in the form of an integrated circuit. The functional blocks of the terminal apparatus and the base station apparatus may be implemented as individual processors, or some or all of the functional blocks may be integrated into a processor. The integrated circuit may be implemented not just by LSI but also in the form of a dedicated circuit or a general-purpose processor. When a circuit integration technology that supplants LSI is made available by the progress of semiconductor technology, an integrated circuit by such technology may be used.

While the embodiments of the present invention have been described above with reference to the drawings, specific configurations are not limited to the embodiments, and designs and the like which do not extend beyond the scope of the present invention are also included in the claims.

INDUSTRIAL APPLICABILITY

The present invention can be utilized as a communication apparatus.

REFERENCE SIGNS LIST

10: Upper layer
11: Modulation unit
12: Transmission weight multiplication unit
13: Pilot signal generation unit
14: D/A conversion unit
15: Wireless unit
16: Antenna
17: Transmission weight calculation unit
18: Demodulation unit
19: A/D conversion unit
20: Wireless unit
21: Antenna
30: Antenna
31: Wireless unit
32: A/D conversion unit
33: Demodulation unit
34: Upper layer
35: Propagation path estimation unit
36: CSI calculation unit
37: Modulation unit
38: Pilot signal generation unit
39: D/A conversion unit
40: Wireless unit
41: Antenna
100: Transmission apparatus (base station apparatus)
101: Reception apparatus
110: Transmission apparatus (base station apparatus)

All of the publications, patents, and patent applications cited in the description are incorporated herein by reference in their entirely.

The invention claimed is:

1. A wireless communication system, comprising:
a base station including a plurality of transmission antennas; and
one or more mobile terminals configured to communicate with the base station, wherein:
the wireless communication system is configured to operate in accordance with at least a first feedback method and a second feedback method, both of which correspond to channel information of each of the one or more mobile terminals;
the first feedback method includes providing feedback information based on a quantized channel and the second feedback method includes providing feedback information in accordance with a selected one of a plurality of predetermined vectors;
the feedback information of the first feedback method includes a larger number of bits than a number of bits required by the feedback information of the second feedback method;
each of the one or more mobile terminals individually selects one of the first feedback method and the second feedback method based on either the channel information of each of the one or more mobile terminals or a function of each of the one or more mobile terminals;
the one or more mobile terminals provide their respective channel information, which corresponds to a communication condition between the one or more mobile terminals and the base station, to the base station through the selected one of the first feedback method and the second feedback method;
the base station is configured to receive the channel information from the one or more mobile terminals and to choose a group of the one or more mobile terminals which has selected a same one of the first feedback method and the second feedback method;
the base station is configured to perform, based on the received channel information, spatial multiplexing of transmission signals addressed to the group of the one or more mobile terminals;
in the second feedback method, the selected one of the plurality of predetermined vectors corresponds to a vector used for precoding selected from candidates determined in advance as known by the base station and the one or more mobile terminals;
the first feedback method is employed when a band width is not less than a predetermined threshold value; and
the second feedback method is employed when the band width is less than the threshold value.

2. The wireless communication system according to claim 1, wherein:
the communication between the base station and the one or more mobile terminals is performed by using a plurality of frequency channels; and
the first feedback method or the second feedback method is selected for each of the plurality of frequency channels.

3. The wireless communication system according to claim 1, wherein:
the first feedback method is employed when the channel information of the one or more mobile terminals indicates that there is a moving speed of less than a predetermined threshold value; and
the second feedback method is employed when the moving speed is not less than the threshold value.

4. The wireless communication system according to claim 1, wherein:
the first feedback method is employed when the channel information of the one or more mobile terminals includes a value indicating frequency variation in the propagation path information that is fed back to the base station is not less than a predetermined threshold value and the propagation path is greatly varied; and the second feedback method is employed when the value indicating the frequency variation is less than the threshold value and the propagation path is moderately varied.

5. The wireless communication system according to claim 1, wherein:

the first feedback method is employed when the channel information of the one or more mobile terminals indicates that communication between the base station and the one or more mobile terminals has a cell area to be controlled which is narrower than a predetermined threshold value; and the second feedback method is employed when the communication between the base station and the one or more mobile terminals has a cell area to be controlled which is wider than the threshold value.

6. A wireless communication system, comprising:

a base station including a plurality of transmission antennas; and one or more mobile terminals configured to communicate with the base station, wherein:

the wireless communication system is configured to operate in accordance with at least a first feedback method and a second feedback method, both of which correspond to channel information of each of the one or more mobile terminals;

the first feedback method includes providing feedback information based on a quantized channel and the second feedback method includes providing feedback information in accordance with a selected one of a plurality of predetermined vectors;

the feedback information of the first feedback method includes a larger number of bits than a number of bits required by the feedback information of the second feedback method;

each of the one or more mobile terminals individually selects one of the first feedback method and the second feedback method based on either the channel information of each of the one or more mobile terminals or a function of each of the one or more mobile terminals;

the one or more mobile terminals provide their respective channel information, which corresponds to a communication condition between the one or more mobile terminals and the base station, to the base station through the selected one of the first feedback method and the second feedback method;

the base station is configured to receive the channel information from the one or more mobile terminals and to choose a group of the one or more mobile terminals which has selected a same one of the first feedback method and the second feedback method;

the base station is configured to perform, based on the received channel information, spatial multiplexing of transmission signals addressed to the group of the one or more mobile terminals;

in the second feedback method, the selected one of the plurality of predetermined vectors corresponds to a vector used for precoding selected from candidates determined in advance as known by the base station and the one or more mobile terminals;

the first feedback method is employed when the channel information of the one or more mobile terminals indicates that there is a reception quality of not less than a predetermined threshold value; and the second feedback method is employed when the reception quality is less than the threshold value.

7. The wireless communication system according to claim 6, wherein:

the first feedback method is employed when the channel information of the one or more mobile terminals indicates that there is a moving speed of less than a predetermined threshold value; and the second feedback method is employed when the moving speed is not less than the threshold value.

8. The wireless communication system according to claim 6, wherein:

the first feedback method is employed when the channel information of the one or more mobile terminals includes a value indicating frequency variation in the propagation path information that is fed back to the base station is not less than a predetermined threshold value and the propagation path is greatly varied; and the second feedback method is employed when the value indicating the frequency variation is less than the threshold value and the propagation path is moderately varied.

9. The wireless communication system according to claim 6, wherein:

the first feedback method is employed when the channel information of the one or more mobile terminals indicates that communication between the base station and the one or more mobile terminals has a cell area to be controlled which is narrower than a predetermined threshold value; and the second feedback method is employed when the communication between the base station and the one or more mobile terminals has a cell area to be controlled which is wider than the threshold value.

10. A mobile terminal in a wireless communication system, comprising:

at least one transmission antenna; wherein the mobile terminal is configured to communicate with a base station including a plurality of transmission antennas;

the mobile terminal is configured to operate in accordance with a first feedback method and a second feedback method, both of which correspond to channel information of the mobile terminal;

the first feedback method includes providing feedback information based on a quantized channel and the second feedback method includes providing feedback information in accordance with a selected one of a plurality of predetermined vectors;

the feedback information of the first feedback method includes a larger number of bits than a number of bits required by the feedback information of the second feedback method;

the mobile terminal is included in a plurality of mobile terminals, each of which individually selects one of the first feedback method and the second feedback method based on either channel information of each of the plurality of mobile terminals or a function of each of the plurality of mobile terminals;

the plurality of mobile terminals provide their respective channel information, which corresponds to a communication condition between the plurality of mobile terminals and the base station, to the base station through the selected one of the first feedback method and the second feedback method;

the base station is configured to receive the channel information from the plurality of mobile terminals and to choose a group of the plurality of mobile terminals which has selected a same one of the first feedback method and the second feedback method;

the base station is configured to perform, based on the received channel information, spatial multiplexing of transmission signals addressed to the group of the plurality of mobile terminals;

in the second feedback method, the selected one of the plurality of predetermined vectors corresponds to a vector used for precoding selected from candidates determined in advance as known by the base station and the one or more mobile terminals;

the first feedback method is employed when a band width is not less than a predetermined threshold value; and the second feedback method is employed when the band width is less than the threshold value.

11. A mobile terminal in a wireless communication system, comprising:

at least one transmission antenna; wherein the mobile terminal is configured to communicate with a base station including a plurality of transmission antennas;

the mobile terminal is configured to operate in accordance with a first feedback method and a second feedback method, both of which correspond to channel information of the mobile terminal;

the first feedback method includes providing feedback information based on a quantized channel and the second feedback method includes providing feedback information in accordance with a selected one of a plurality of predetermined vectors;

the feedback information of the first feedback method includes a larger number of bits than a number of bits required by the feedback information of the second feedback method;

the mobile terminal is included in a plurality of mobile terminals, each of which individually selects one of the first feedback method and the second feedback method based on either channel information of each of the plurality of mobile terminals or a function of each of the plurality of mobile terminals;

the plurality of mobile terminals provide their respective channel information, which corresponds to a communication condition between the plurality of mobile terminals and the base station, to the base station through the selected one of the first feedback method and the second feedback method;

the base station is configured to receive the channel information from the plurality of mobile terminals and to choose a group of the plurality of mobile terminals which has selected a same one of the first feedback method and the second feedback method;

the base station is configured to perform, based on the received channel information, spatial multiplexing of transmission signals addressed to the group of the plurality of mobile terminals;

in the second feedback method, the selected one of the plurality of predetermined vectors corresponds to a vector used for precoding selected from candidates determined in advance as known by the base station and the one or more mobile terminals;

the first feedback method is employed when the channel information of the one or more mobile terminals indicates that there is a reception quality of not less than a predetermined threshold value; and the second feedback method is employed when the reception quality is less than the threshold value.

* * * * *